(12) United States Patent
Ganireddy et al.

(10) Patent No.: US 10,396,695 B2
(45) Date of Patent: Aug. 27, 2019

(54) METHOD FOR PROTECTING AN ELECTRICAL POWER SYSTEM

(71) Applicant: General Electric Company, Schenectady, NY (US)

(72) Inventors: Govardhan Ganireddy, Roanoke, VA (US); John Leo Bollenbecker, Albany, NY (US); Rajni Burra, Clifton Park, NY (US); Robert Gregory Wagoner, Roanoke, VA (US); Anthony Michael Klodowski, Hardy, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/490,079

(22) Filed: Apr. 18, 2017

(65) Prior Publication Data

US 2018/0302011 A1    Oct. 18, 2018

(51) Int. Cl.
*H02P 9/00* (2006.01)
*H02J 3/38* (2006.01)
(Continued)

(52) U.S. Cl.
CPC ........... *H02P 9/007* (2013.01); *H02H 7/262* (2013.01); *H02J 3/386* (2013.01); *H02H 7/062* (2013.01); *Y02E 10/725* (2013.01); *Y02E 10/763* (2013.01)

(58) Field of Classification Search
CPC ........... H02P 9/007; H02J 3/386; H02H 7/262
See application file for complete search history.

(56) References Cited

U.S. PATENT DOCUMENTS 3,593,106 A    7/1971 Lafuze
4,281,371 A    7/1981 Baker
(Continued)

FOREIGN PATENT DOCUMENTS

EP         1276219 A1    1/2003
WO    WO2009/138808 A1   11/2009
(Continued)

OTHER PUBLICATIONS

Baron et al., Breaking the 34.5kV Standard, Drawing on hydro experience, Acciona extols use of 12kV collection system to lower energy costs through elimination of step-up transformers, Wind Systems Magazine, Apr. 2013, pp. 48-54.
(Continued)

*Primary Examiner* — Viet P Nguyen
(74) *Attorney, Agent, or Firm* — Dority & Manning, P.A.

(57) ABSTRACT

The present disclosure is directed to a method for protecting an electrical power system connected to a power grid. The electrical power system includes at least one cluster of electrical power subsystems. Each of the electrical power subsystems defines a stator power path and a converter power path for providing power to the power grid. The converter power path includes a partial power transformer. The electrical power system further includes a subsystem switch configured with each of the electrical power subsystems and a cluster transformer connecting each cluster of electrical power subsystems to the power grid. A cluster switch is configured with the cluster transformer. A controller is communicatively coupled to each of the plurality of electrical power subsystems. Thus, the controller monitors the electrical power system for faults, and if a fault is detected in the cluster, sends, via one of the subsystem switches or the power converters, a block signal to the cluster switch.

18 Claims, 9 Drawing Sheets

(51) Int. Cl.
*H02H 7/26* (2006.01)
*H02H 7/06* (2006.01)

(56) References Cited

U.S. PATENT DOCUMENTS

| | | | |
|---|---|---|---|
| 5,047,910 A | 9/1991 | Levran et al. | |
| 7,119,452 B2 | 10/2006 | Larsen | |
| 7,166,928 B2 | 1/2007 | Larsen | |
| 7,187,566 B2 | 3/2007 | Kawashima et al. | |
| 7,212,421 B2 | 5/2007 | Chandra et al. | |
| 7,224,081 B2 | 5/2007 | Larsen | |
| 7,521,907 B2 | 4/2009 | Cervera et al. | |
| 7,923,862 B2 | 4/2011 | Cardinal et al. | |
| 8,013,580 B2 | 9/2011 | Cervera et al. | |
| 8,041,465 B2 | 10/2011 | Larsen et al. | |
| 8,659,178 B2 | 2/2014 | Arlaban Gabeiras et al. | |
| 8,669,669 B1 | 3/2014 | Wagoner et al. | |
| 8,736,241 B2 | 5/2014 | Cervera et al. | |
| 9,537,437 B2 | 1/2017 | Wagoner et al. | |
| 9,587,626 B2 | 3/2017 | Sadaba et al. | |
| 9,745,959 B2* | 8/2017 | Langel | F03D 9/257 |
| 2007/0278797 A1 | 12/2007 | Flannery et al. | |
| 2008/0069692 A1* | 3/2008 | Oohara | F03D 7/0224 416/31 |
| 2009/0146500 A1 | 6/2009 | Jones et al. | |
| 2009/0171509 A1* | 7/2009 | Lindahl | H02H 7/067 700/292 |
| 2010/0235119 A1* | 9/2010 | Garcia | H02J 3/386 702/59 |
| 2010/0276930 A1* | 11/2010 | Fortmann | H02J 3/386 290/44 |
| 2011/0134574 A1 | 6/2011 | Ritter | |
| 2012/0101643 A1* | 4/2012 | Kirchner | F03D 7/0284 700/287 |
| 2012/0267896 A1* | 10/2012 | Cousineau | H02H 7/30 290/55 |
| 2013/0138257 A1* | 5/2013 | Edenfeld | F03D 7/04 700/287 |
| 2013/0286692 A1 | 10/2013 | Patel et al. | |
| 2013/0289911 A1 | 10/2013 | Patel et al. | |
| 2014/0092650 A1* | 4/2014 | Alston | H02J 3/36 363/35 |
| 2014/0246857 A1 | 9/2014 | Giertz et al. | |
| 2014/0253058 A1 | 9/2014 | Cervera et al. | |
| 2014/0265583 A1* | 9/2014 | Chaudhuri | H02J 1/00 307/52 |
| 2014/0320056 A1 | 10/2014 | Royak et al. | |
| 2015/0137518 A1* | 5/2015 | Yin | F03D 7/0284 290/44 |
| 2015/0152850 A1* | 6/2015 | Nielsen | F03D 9/005 290/44 |
| 2016/0333856 A1* | 11/2016 | Zabalza | H02H 7/06 |
| 2017/0009738 A1* | 1/2017 | Brogan | F03D 7/0276 |
| 2017/0314534 A1* | 11/2017 | Gupta | F03D 7/048 |

FOREIGN PATENT DOCUMENTS

| | | | | |
|---|---|---|---|---|
| WO | 2012/073228 A1 | 6/2012 | | |
| WO | WO 2016062316 A1 * | 4/2016 | | F03D 7/0284 |

OTHER PUBLICATIONS

Olonso Sadaba et al., Wind Generation Control Strategies for Grid Integration Acciona Windpower Experience, ResearchGate, Acciona Windpower, S.A., uploaded 2015, 11 Pages. https://www.researchgate.net/publication/267966410.

International Search Report and Written Opinion issued in connection with corresponding PCT Application No. PCT/US2018/31088 dated Feb. 1, 2019.

* cited by examiner

METHOD FOR PROTECTING AN ELECTRICAL POWER SYSTEM

FIELD OF THE INVENTION

The present disclosure relates generally to electrical power systems and, more particularly, to methods for protecting electrical power systems, such as wind turbines.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

For example, FIGS. 1 and 2 illustrate a wind turbine 10 and associated power system suitable for use with the wind turbine 10 according to conventional construction. As shown, the wind turbine 10 includes a nacelle 14 that typically houses a generator 28 (FIG. 2). The nacelle 14 is mounted on a tower 12 extending from a support surface (not shown). The wind turbine 10 also includes a rotor 16 that includes a plurality of rotor blades 20 attached to a rotating hub 18. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is typically connected to a power grid via a grid breaker 36. Thus, the main transformer 34 steps up the voltage amplitude of the electrical power such that the transformed electrical power may be further transmitted to the power grid.

In addition, as shown, the generator 28 is typically electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 to provide multi-phase power (e.g. three-phase power) having a frequency maintained substantially at the frequency of the power grid (e.g. 50 Hz/60 Hz).

As shown in FIG. 2, the illustrated three-winding transformer 34 typically has (1) a 33 kilovolt (kV) medium voltage (MV) primary winding 33 connected to the power grid, (2) a 6 to 13.8 kV MV secondary winding 35 connected to the generator stator 32, and (3) a 690 to 900 volt (V) low-voltage (LV) tertiary winding 37 connected to the line-side power converter 42.

Referring now to FIG. 3, individual power systems of a plurality of wind turbines 10 may be arranged in a predetermined geological location and electrically connected together to form a wind farm 46. More specifically, as shown, the wind turbines 10 may be arranged into a plurality of groups 48 with each group separately connected to a main line 50 via switches 51, 52, 53, respectively. In addition, as shown, the main line 50 may be electrically coupled to another, larger transformer 54 for further stepping up the voltage amplitude of the electrical power from the groups 48 of wind turbines 10 before sending the power to the grid.

In the event of a fault in one of the wind turbine power systems, e.g. in the generator 28 thereof, the impedance of the transformer 34 of that system effects the fault current contribution from the grid and other wind turbine power systems. More specifically, the transformer 34 limits the maximum value of current that will flow under a fault, which helps in isolating the turbine under fault from the rest of the power system. As such, the circuit breaker 36 of that system is configured to trip when a fault occurs in the system to isolate that system from the others. In such systems, however, the three-winding transformers 34 associated with each turbine 10 is expensive. Particularly, the secondary winding 35 of the transformer 34 that is connected to the generator stator 32 can be costly.

Thus, it would be advantageous to eliminate such three-winding transformers from wind turbine power systems. However, since such conventional power systems are effective at sensing and isolating various types of faults, it would be advantageous to provide a wind turbine power system that could operate without the main three-winding transformer described above, but that maintains the systems' ability to protect the wind turbine and electrical balance of plant from various faults.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an electrical power system connected to a power grid. The electrical power system includes at least one cluster of electrical power subsystems. Each of the electrical power subsystems includes a power converter electrically coupled to a generator having a generator rotor and a generator stator. Further, each of the electrical power subsystems defines a stator power path and a converter power path for providing power to the power grid. In addition, the converter power path includes a partial power transformer. The electrical power system further includes a subsystem switch configured with each of the electrical power subsystems. Moreover, the electrical power system includes a cluster transformer connecting each cluster of electrical power subsystems to the power grid. A cluster switch is configured with the cluster transformer. Further, a controller is communicatively coupled to each of the plurality of electrical power subsystems. Thus, the controller is configured to perform one or more operations, including but not limited to monitoring the electrical power system for faults, and if a fault is detected in one of the electrical power subsystems, sending, via one of the subsystem switches or one of the power converters, a block signal to the cluster switch.

In one embodiment, the partial power transformer may include a two-winding transformer. Alternatively, the partial power transformer may include a three-winding transformer, with the third winding being for auxiliary loads. In another embodiment, the subsystem switches and the cluster switch may include subsystem relays and a cluster relay, respectively. More specifically, in certain embodiments, the subsystem relays and the cluster relay may be differential relays configured to isolate the fault in one of the electrical power subsystems.

In further embodiments, the step of monitoring the electrical power system for faults may include monitoring the stator power path of each of the electrical power systems for electrical faults. In such embodiments, if the subsystem switch is unable to clear the fault, the controller is further configured to drop the block signal.

In additional embodiments, the generator of each of the electrical power subsystems may be a doubly-fed induction generator (DFIG). Further, in several embodiments, the electrical power system may be a wind farm and the electrical power subsystems may be wind turbine power systems.

In another aspect, the present subject matter is directed to an electrical power system connected to a power grid. The electrical power system includes at least one cluster of electrical power subsystems. Each of the electrical power subsystems includes a power converter electrically coupled to a generator having a generator rotor and a generator stator. Further, each of the electrical power subsystems defines a stator power path and a converter power path for providing power to the power grid. In addition, the converter power path includes a partial power transformer. The electrical power system further includes a subsystem switch configured with each of the electrical power subsystems. Moreover, the electrical power system includes a cluster transformer connecting each cluster of electrical power subsystems to the power grid. A cluster switch is configured with the cluster transformer. Further, a controller is communicatively coupled to each of the plurality of electrical power subsystems. Thus, the controller is configured to perform one or more operations, including but not limited to monitoring the electrical power system for faults and if a fault is detected in the cluster, sending, via the cluster switch, a trip signal to at least one of the subsystem switches or one of the power converters of the electrical power subsystems to disconnect at least one of the electrical power subsystems from the power grid. It should be understood that the electrical power system may further include any of the additional features and/or embodiments as described herein.

More specifically, in one embodiment, the step of monitoring the electrical power system for faults may include monitoring at least one of the cluster transformer for grid-open faults or the stator power path of each of the electrical power systems for electrical faults. Thus, in certain embodiments, if an electrical fault is detected, the one or more operations of the controller may further include sending, via the cluster switch, the trip signal to each of the subsystem switches or each of the power converters to disconnect each of the electrical power subsystems from the power grid.

In yet another aspect, the present subject matter is directed to a method for protecting an electrical power system. The electrical power system includes a plurality of clusters of electrical power subsystems with a cluster transformer connecting each cluster of electrical power subsystems to a power grid. Each of the electrical power subsystems includes a power converter electrically coupled to a generator having a generator rotor and a generator stator. Further, each of the electrical power subsystems defines a stator power path and a converter power path for providing power to the power grid. In addition, the converter power path includes a partial power transformer. As such, the method includes monitoring the electrical power system for faults. Upon detection of a fault in one of the clusters of the electrical power subsystems, the method also includes determining a location of the fault. If the fault is located within one of the electrical power subsystems, the method includes sending, via a subsystem switch electrically coupled with the electrical power subsystem experiencing the fault or the power converter of the electrical power subsystem experiencing the fault, a block signal to a cluster switch electrically coupled to the cluster transformer associated with the cluster experiencing the fault. Alternatively, if the fault is located outside of the electrical power subsystems, the method includes sending, via the cluster switch, a trip signal to each subsystem switch or power converter within the cluster experiencing the fault. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
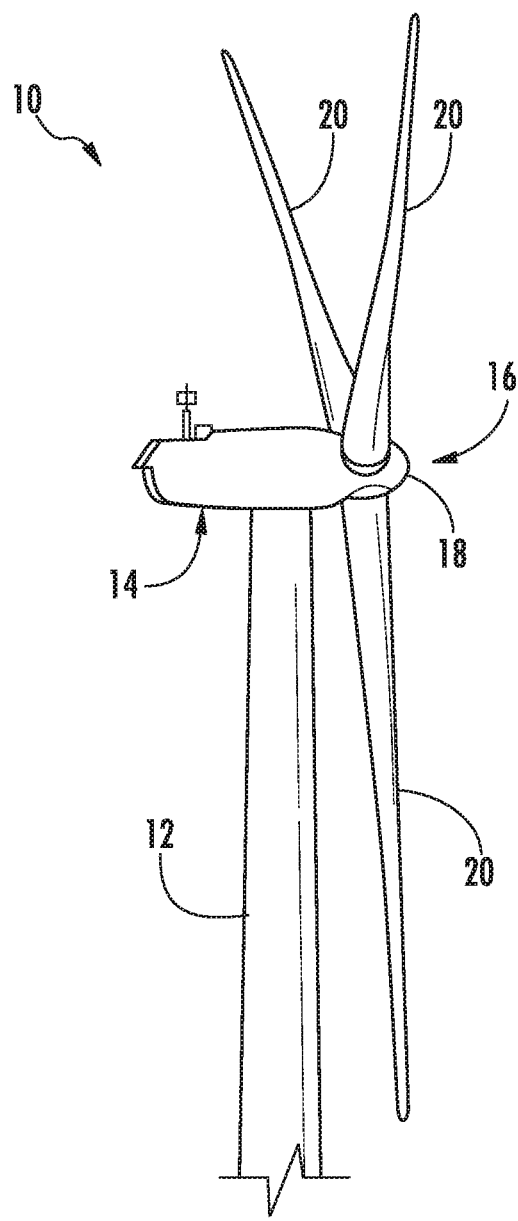
FIG. 1 illustrates a perspective view of a portion of one embodiment of a wind turbine according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to systems and methods for protecting an electrical power system, such as wind turbines. More specifically, the system includes a controller configured to implement a protection scheme to improve the reliability of such a wind turbine system, e.g. during various electrical faults. For example, when a short-circuit fault occurs in the stator power path of a wind turbine, both the generator relay (also referred to herein as a subsystem relay) and cluster relay see the fault current, thereby resulting in tripping of the cluster transformer. This tripping action can be avoided, however, by configuring the generator relays to send a block signal to the cluster relay. If the generator relay is unable to clear the fault, then the relay can drop the block signal or the same can be communicated by a separate communication line. In alternative embodiments, if the relay fails to drop the block signal, the cluster relay may trip after a predetermined time delay. In addition, if the controller detects a short-circuit fault or a grid open fault in the cluster transformer and if the cluster relay picks up the fault, then the cluster relay can send a trip signal to the generator relays, thereby resulting in fast disconnection of the wind turbines from the grid. The relay circuits, as well as the converter controllers, are configured to receive the trip signal. In the absence of such a control scheme, the wind turbines will attempt to ride-thru these faults (e.g. via islanding/LVRT) leading to excessive stress on the electrical components.

The relays described herein can be configured as differential relays in order to isolate a fault in a single wind turbine to disconnect only the appropriate wind turbine during a fault. As such, the fault current will flow in the relay near the cluster transformer and also in the single wind turbine experiencing the fault. In this case, only the single wind turbine is disconnected. Alternately, if the fault current flows in the relay near the cluster transformer but not in any of the single wind turbines, the fault can be known to be between the cluster transformer and the wind turbines in that cluster. Differential relays may sense differences in the magnitude of the fault currents and may also have information about the direction of power flow and/or phase angle of the currents. Using this information from the differential relays, the control logic is able to sort out all of the different fault locations and open the appropriate circuit breakers to isolate the fault with minimal disruption to the output power of the wind turbine cluster.

Figure 4:
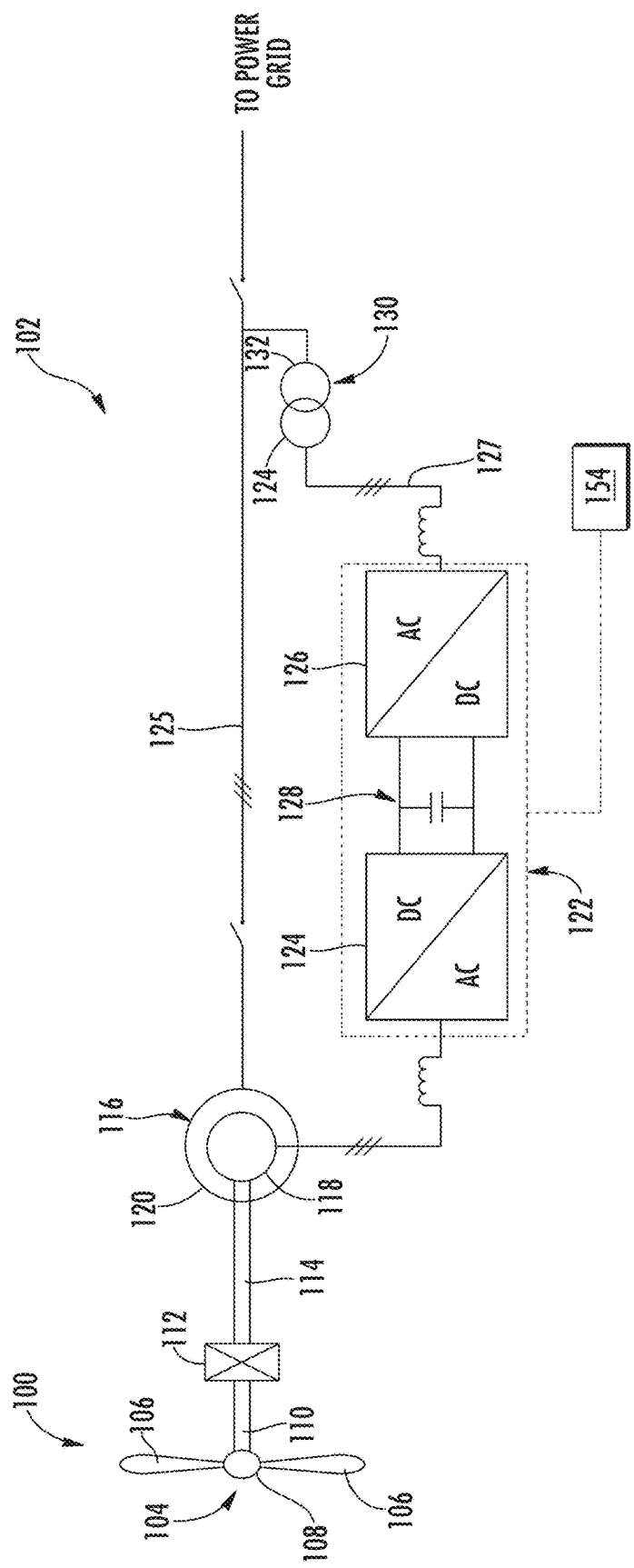
FIG. 4 illustrates a schematic diagram of one embodiment of an electrical power system for a wind turbine according to the present disclosure.

Referring now to FIG. 4, a schematic diagram of one embodiment of an electrical power subsystem 102 according to the present disclosure is illustrated. It should be understood that the term "subsystem" is used herein to distinguish between the individual power systems (e.g. as shown in FIG. 4) and the overall electrical power system 105 of FIG. 5 that includes a plurality of electrical power subsystems 102. Those of ordinary skill in the art, however, will recognize that the electrical power subsystem 102 of FIG. 4 may also be referred to more generically, such as a simply a system (rather than a subsystem). Therefore, such terms may be used interchangeably and are not meant to be limiting.

Further, as shown, the electrical power subsystem 102 may correspond to a wind turbine power system 100. More specifically, as shown, the wind turbine power system 100 includes a rotor 104 that includes a plurality of rotor blades 106 attached to a rotating hub 108. As wind impacts the rotor blades 106, the blades 106 transform wind energy into a mechanical rotational torque that rotatably drives a low-speed shaft 110. The low-speed shaft 110 is configured to drive a gearbox 112 that subsequently steps up the low rotational speed of the low-speed shaft 110 to drive a high-speed shaft 114 at an increased rotational speed. The high-speed shaft 114 is generally rotatably coupled to a doubly-fed induction generator 116 (referred to hereinafter as DFIG 116) so as to rotatably drive a generator rotor 118. As such, a rotating magnetic field may be induced by the generator rotor 118 and a voltage may be induced within a generator stator 120 that is magnetically coupled to the generator rotor 118. In one embodiment, for example, the generator 116 is configured to convert the rotational mechanical energy to a sinusoidal, three-phase alternating current (AC) electrical energy signal in the generator stator 120. Thus, as shown, the associated electrical power can be transmitted from the generator stator 120 directly the grid.

Figure 2:
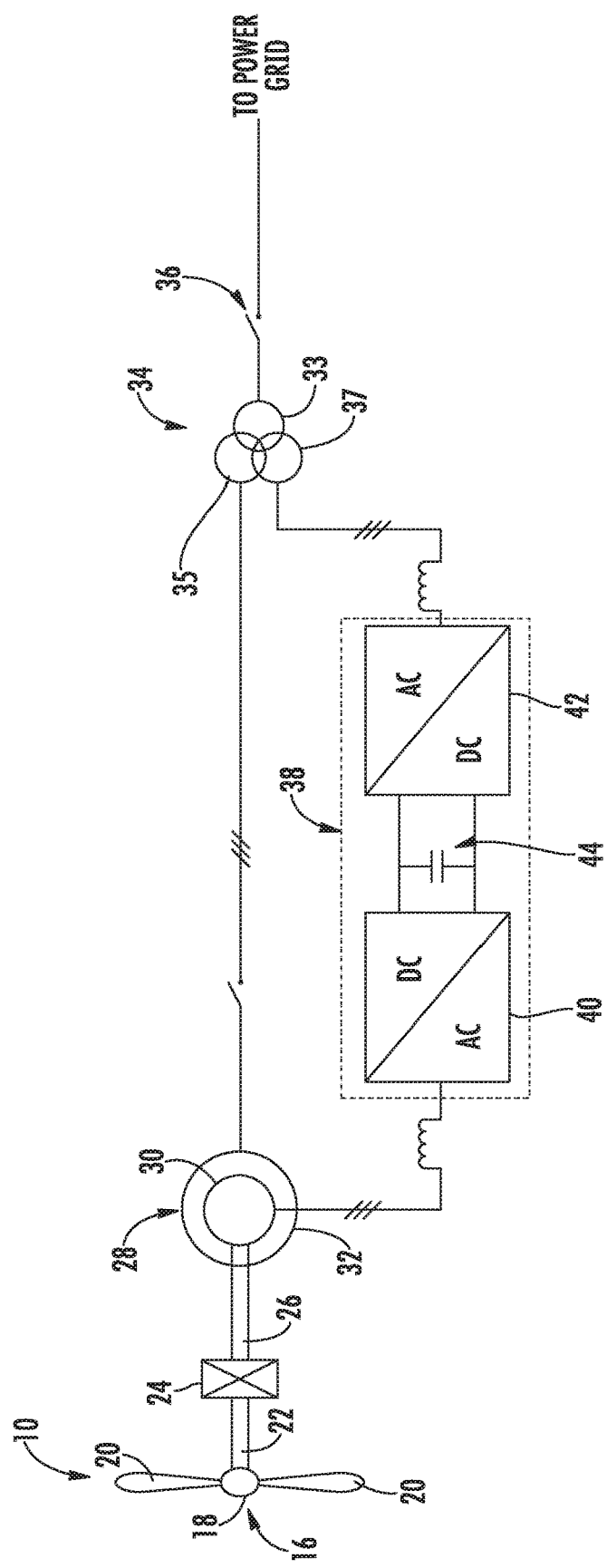
FIG. 2 illustrates a schematic diagram of a conventional electrical power system suitable for use with the wind turbine shown in FIG. 1.
Figure 3:
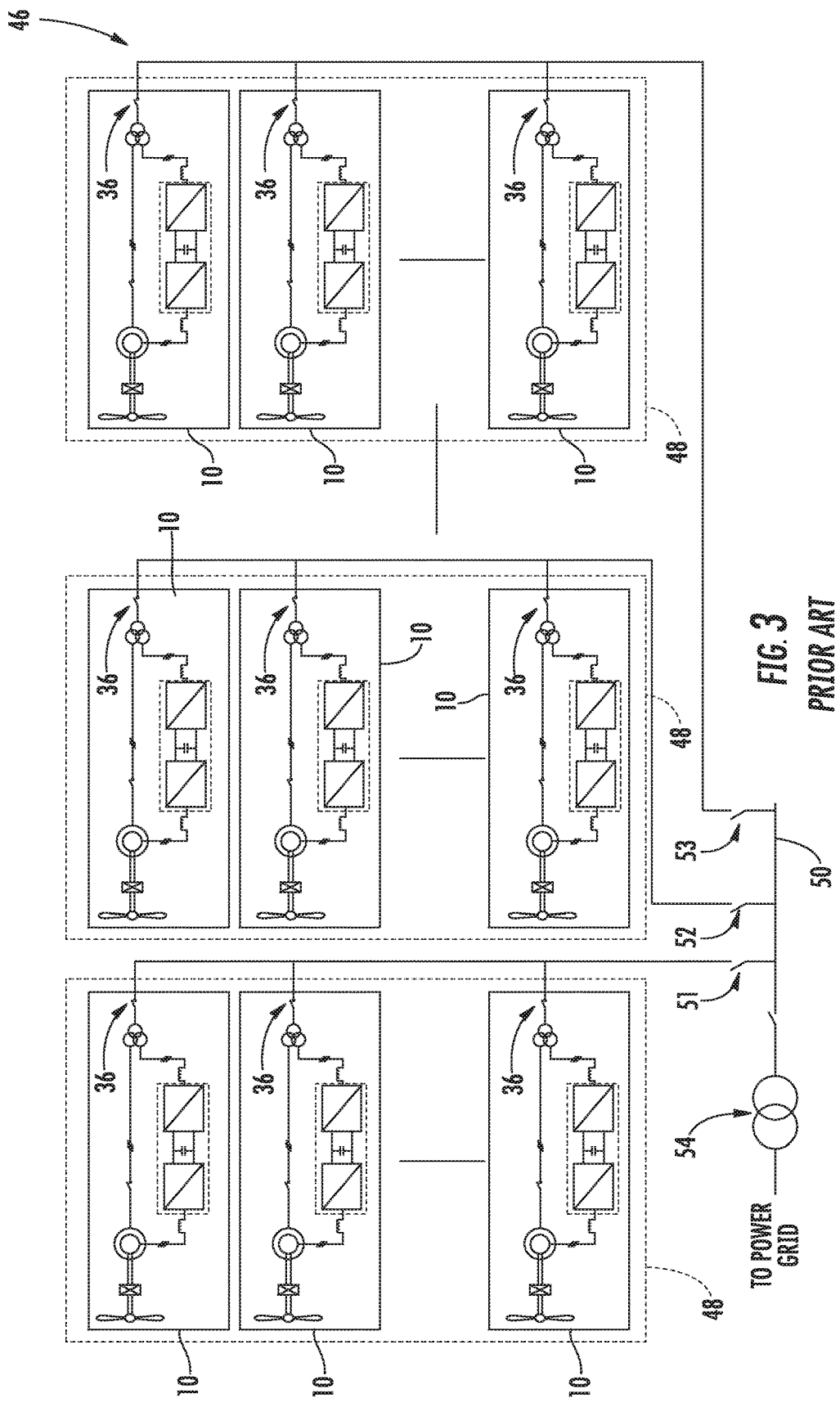
FIG. 3 illustrates a schematic diagram of one embodiment of a conventional wind farm according to conventional construction, particularly illustrating a plurality of wind turbine power systems such as those illustrated in FIG. 2 connected to a single sub-station transformer.

In addition, as shown, the generator 116 is electrically coupled to a bi-directional power converter 122 that includes a rotor-side converter 124 joined to a line-side converter 126 via a regulated DC link 128. Thus, the rotor-side converter 124 converts the AC power provided from the generator rotor 118 into DC power and provides the DC power to the DC link 128. The line side converter 126 converts the DC power on the DC link 128 into AC output power suitable for the power grid. More specifically, as shown, the AC power from the power converter 122 can be combined with the power from the generator stator 120 via a converter power path 127 and a stator power path 125, respectively. For example, as shown, and in contrast to conventional systems such as those illustrated in FIGS. 1-3, the converter power path 127 may include a partial power transformer 130 for stepping up the voltage amplitude of the electrical power from the power converter 122 such that the transformed electrical power may be further transmitted to the power grid. Thus, as shown, the illustrated system 102 of FIG. 4 does not include the conventional three-winding main transformer described above. Rather, as shown in the illustrated embodiment, the partial power transformer 130 may correspond to a two-winding transformer having a primary winding 132 connected to the power grid and a secondary winding 134 connected to the rotor side converter 124.

In addition, the electrical power subsystem 102 may include a controller 136 configured to control any of the components of the wind turbine 100 and/or implement the method steps as described herein. For example, as shown particularly in FIG. 6, the controller 136 may include one or more processor(s) 138 and associated memory device(s) 140 configured to perform a variety of computer-implemented functions (e.g., performing the methods, steps, calculations and the like and storing relevant data as disclosed herein). Additionally, the controller 136 may also include a communications module 142 to facilitate communications between the controller 136 and the various components of the wind turbine 100, e.g. any of the components of FIGS. 4 and 5. Further, the communications module 142 may include a sensor interface 144 (e.g., one or more analog-to-digital converters) to permit signals transmitted from one or more sensors 139, 141, 143 to be converted into signals that can be understood and processed by the processors 138. It should be appreciated that the sensors 139, 141, 143 may be communicatively coupled to the communications module 142 using any suitable means. For example, as shown in FIG. 6, the sensors 139, 141, 143 may be coupled to the sensor interface 144 via a wired connection. However, in other embodiments, the sensors 139, 141, 143 may be coupled to the sensor interface 144 via a wireless connection, such as by using any suitable wireless communications protocol known in the art. As such, the processor 138 may be configured to receive one or more signals from the sensors 139, 141, 143.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 138 is also configured to compute advanced control algorithms and communicate to a variety of Ethernet or serial-based protocols (Modbus, OPC, CAN, etc.). Additionally, the memory device(s) 140 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the controller 136 to perform the various functions as described herein.

In operation, alternating current (AC) power generated at the generator stator 120 by rotation of the rotor 104 is provided via a dual path to the grid, i.e. via the stator power path 125 and the converter power path 127. More specifically, the rotor side converter 124 converts the AC power provided from the generator rotor 118 into DC power and provides the DC power to the DC link 128. Switching elements (e.g. IGBTs) used in bridge circuits of the rotor side converter 124 can be modulated to convert the AC power provided from the generator rotor 118 into DC power suitable for the DC link 124. The line side converter 126 converts the DC power on the DC link 128 into AC output power suitable for the grid. In particular, switching elements (e.g. IGBTs) used in bridge circuits of the line side converter 126 can be modulated to convert the DC power on the DC link 128 into AC power. As such, the AC power from the power converter 122 can be combined with the power from the generator stator 120 to provide multi-phase power having a frequency maintained substantially at the frequency of the bus. It should be understood that the rotor side converter 124 and the line side converter 126 may have any configuration using any switching devices that facilitate operation of electrical power system 200 as described herein.

Further, the power converter 122 may be coupled in electronic data communication with the turbine controller 136 and/or a separate or integral converter controller 154 to control the operation of the rotor side converter 124 and the line side converter 126. For example, during operation, the controller 136 may be configured to receive one or more voltage and/or electric current measurement signals from the first set of voltage and electric current sensors 139, 141, 143. Thus, the controller 136 may be configured to monitor and control at least some of the operational variables associated with the wind turbine 100 via the sensors 139, 141, 143. In the illustrated embodiment, the sensors 139, 141, 143 may be electrically coupled to any portion of electrical power subsystem 102 that facilitates operation of electrical power subsystem 102 as described herein.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the converter controller 154 is configured to receive one or more voltage and/or electric current feedback signals from the sensors 139, 141, 143. More specifically, in certain embodiments, the current or voltage feedback signals may include at least one of line feedback signals, line-side converter feedback signals, rotor-side converter feedback signals, or stator feedback signals.

Figure 5:
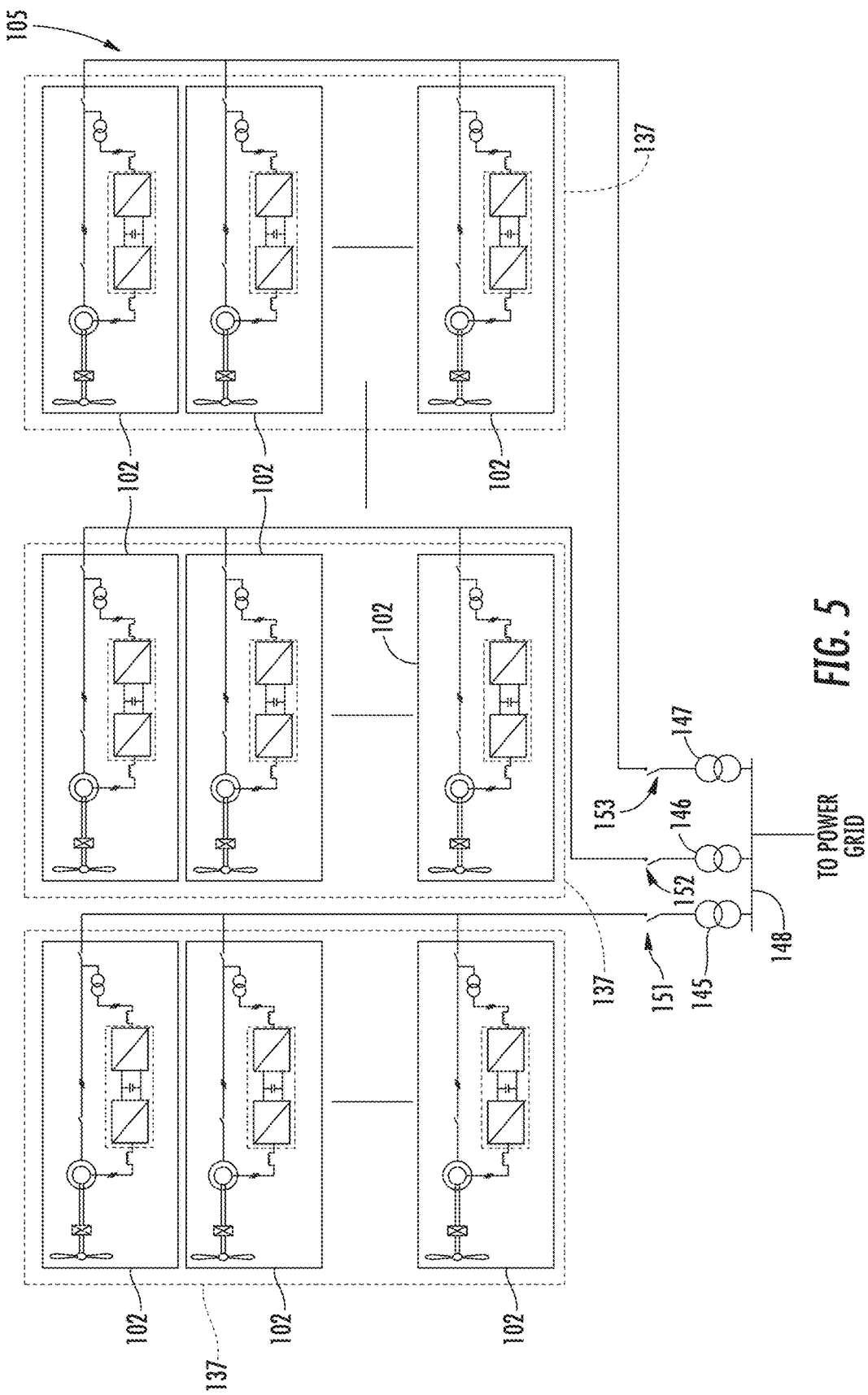
FIG. 5 illustrates a schematic diagram of one embodiment of a wind farm according to the present disclosure, particularly illustrating a plurality of wind turbine clusters each connected to the grid via a cluster transformer.
Figure 6:
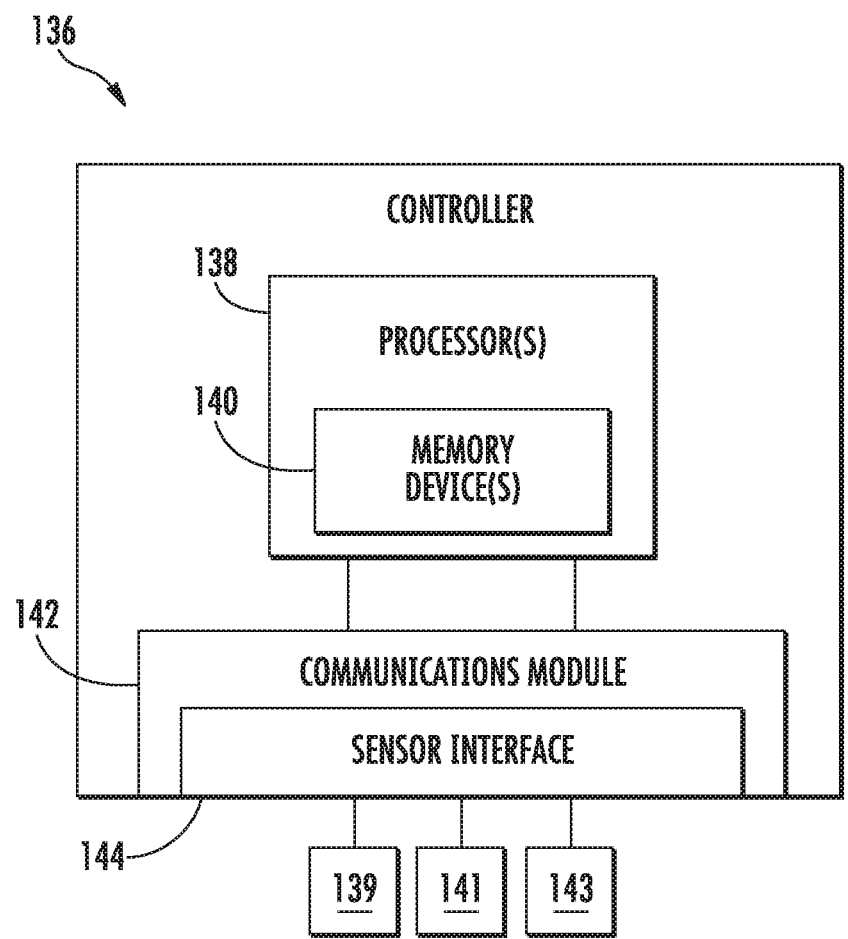
FIG. 6 illustrates a block diagram of one embodiment of a wind turbine controller according to the present disclosure.

Referring particularly to FIG. 5, individual power systems (such as the power subsystem 102 illustrated in FIG. 4) may be arranged in at least two clusters 137 to form an electrical power system 105. More specifically, as shown, the wind turbine power systems 100 may be arranged into a plurality of clusters 137 so as to form a wind farm. Thus, as shown, each cluster 137 may be connected to a separate transformer 145, 146, 147 via switches 150, 151, 152, respectively, for stepping up the voltage amplitude of the electrical power from each cluster 137 such that the transformed electrical power may be further transmitted to the power grid. In addition, as shown, the transformers 145, 146, 147 are connected to a main line 148 that combines the voltage from each cluster 137 before sending the power to the grid. In other words, as shown, the stator power circuit of all the wind turbines 100 share a common ground reference provided by the neutral of the secondary winding 124 of the cluster transformer 130 or by a separate neutral grounding transformer.

In certain instances, however, there may be disadvantages associated with protecting the cluster arrangement of FIG. 5, e.g. as it relates to faults. For example, a line-earth fault in one of the wind turbines 100 of one of the clusters 137 can trigger the protective relays in the cluster substation (i.e. one of the transformers 145, 146, 147), thereby tripping the cluster substation and thus, interrupting the operation of remaining wind turbines 100 in that cluster 137. Further, the difference between the available fault current at the wind turbine 100 and the available fault current at the cluster 137 is small (only limited by the cable impedances) due to the absence of impedance from the stator winding 35 of the main transformer 34 discussed in FIGS. 1-5, therefore, it is difficult to implement selective protection coordination between the protective relays in the wind turbines 100 and those in the cluster substation.

Figure 7:
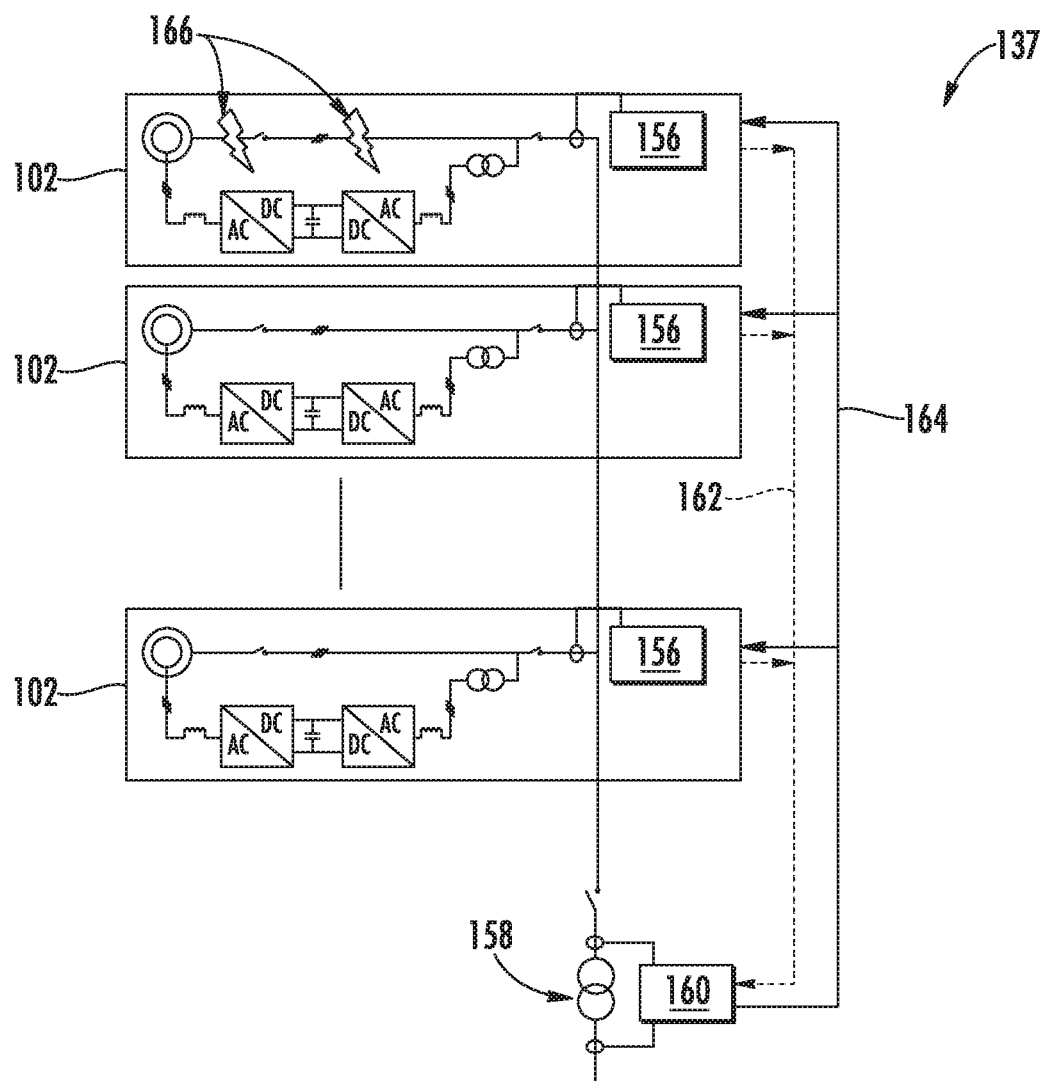
FIG. 7 illustrates a schematic diagram of one embodiment of a wind turbine cluster according to the present disclosure, particularly illustrating a block signal being sent from each subsystem switch to the cluster switch in the event of a ground fault.
Figure 8:
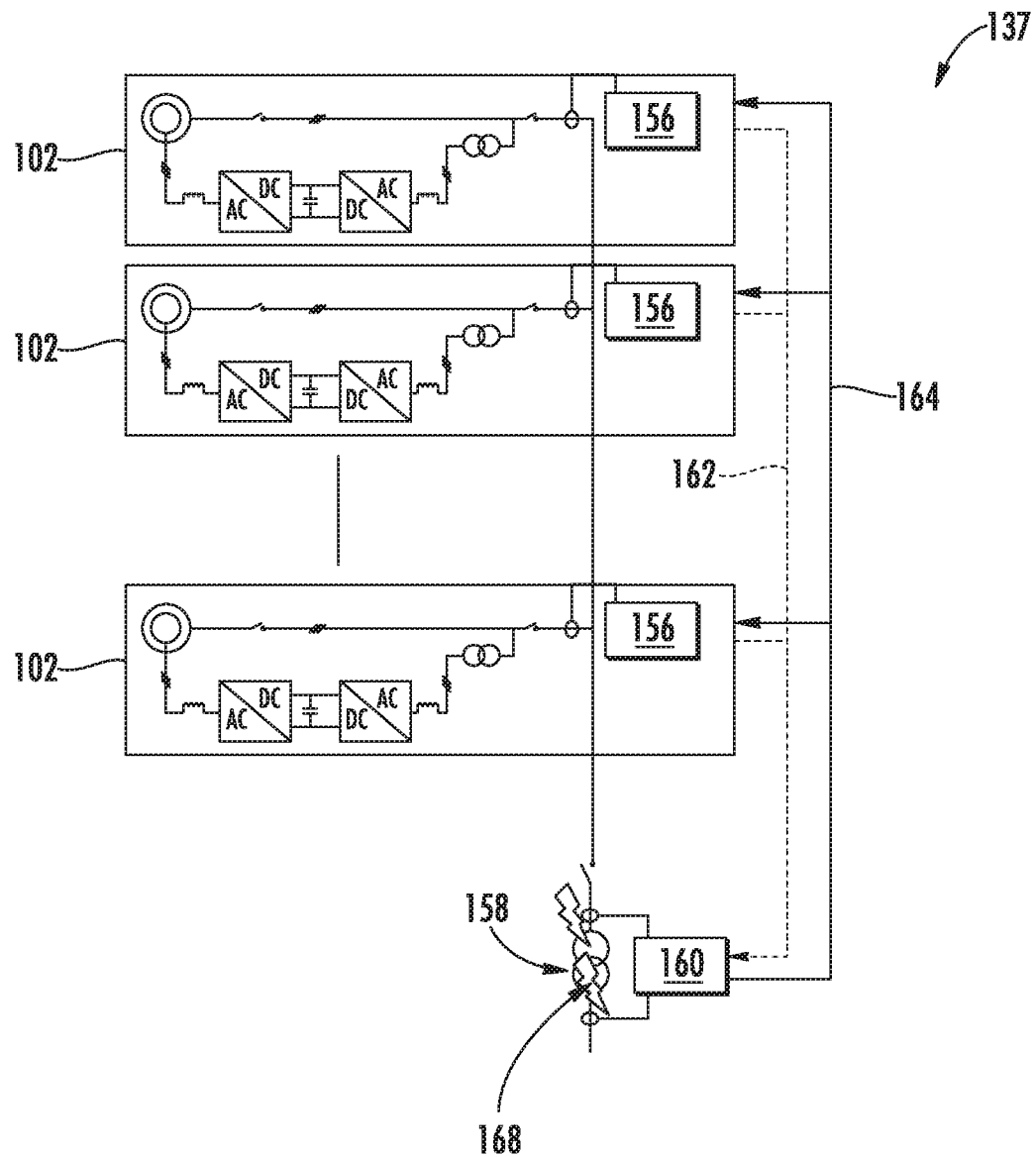
FIG. 8 illustrates a schematic diagram of one embodiment of a wind turbine cluster according to the present disclosure, particularly illustrating a trip signal being sent from the cluster switch to each of the subsystem switches to in the event of a fault in the cluster transformer.

Accordingly, as shown in FIGS. 7 and 8, various illustrations are provided to further describe the systems and methods of the present disclosure. For example, FIG. 7 illustrates a schematic diagram of one embodiment of a wind turbine cluster 137 according to the present disclosure, particularly illustrating a block signal 162 being sent from each subsystem switch 156 to the cluster switch 160 in the event of a ground fault; and FIG. 8 illustrates a schematic diagram of one embodiment of a wind turbine cluster 137 according to the present disclosure, particularly illustrating a trip signal 164 being sent from the cluster switch 160 to each of the subsystem switches 156 (or the each of the power converters 122) in the event of a fault in the cluster transformer 158.

More specifically, as shown in FIGS. 7 and 8, the cluster 137 of electrical power subsystems 102 includes a subsystem switch 156 electrically coupled with each of the electrical power subsystems 102. Further, as shown in FIGS. 5, 7, and 8, the cluster 137 includes a cluster transformer 158 connecting each cluster 137 of electrical power subsystems 102 to the power grid. Thus, the cluster 137 also includes a cluster switch 160 configured with the cluster transformer 158. More specifically, in certain embodiments, the subsystem switches 156 and the cluster switch 160 may include subsystem relays and a cluster relay, respectively. For example, in certain embodiments, the subsystem relays and the cluster relay may be differential relays configured to isolate the fault in one of the electrical power subsystems 102.

As used herein, a "relay" generally refers to an electrically-operated switch. For example, certain relays use an electromagnet to mechanically operate a switch, as well as solid-state relays. As such, relays may be useful where it is necessary to control a circuit by a separate low-power signal, or where several circuits must be controlled by one signal. Further, as shown, the cluster transformer 158 may be a two-winding transformer. In addition, differential relays may sense differences in the magnitude of the fault currents and may also have information about the direction of power flow and/or phase angle of the currents. Using this information from the differential relays, the controller 136 is able to sort out all of the different fault locations and open the appropriate circuit breakers to isolate the fault with minimal disruption to the output power of the wind turbine cluster 137.

Accordingly, the controller 136 described herein is communicatively coupled to each of the plurality of electrical power subsystems 102 so as to control operation thereof. More specifically, as shown particularly in FIG. 7, the controller 136 is configured to monitor the electrical power system 105 for faults. For example, in certain embodiments, the controller 136 may be configured to monitor the stator power path 125 of each of the electrical power subsystems 102 and/or the cluster transformer for electrical faults. If a fault is detected, the controller 136 is configured to send, via one of the subsystem switches or relays 156, a block signal 162 to the cluster switch 160.

As used herein, a block signal generally refers to signal that is sent from a downstream device to communicate with an upstream protective device to not trip in response to the fault current it is sensing. In the absence of the impedance from the main transformer 34 (FIGS. 1-3), the fault current levels at the wind turbine 100 and the cluster 137 are going to very similar. Thus, in the scenario of a fault inside a wind turbine 100, the cluster switch 160 may also trip, resulting in the trip of all the wind turbines 100. With the help of block signal 162, the cluster switch 160 can be prevented from tripping immediately and will let the subsystem switches 156 handle the fault first.

For example, as shown in FIG. 7, the fault is indicated by reference character 166. As such, the subsystem switch 156 (or power converter 122) associated with the electrical power subsystem 102 experiencing the fault sends the block signal 162 to the cluster switch 160. More specifically, in certain embodiments, the subsystem relays 156 described herein can be configured as differential relays in order to isolate a fault in a single wind turbine to disconnect only the appropriate wind turbine during the fault. As such, the fault current will flow in the subsystem relay 156 near the cluster transformer 158 and also in the single wind turbine 100 experiencing the fault. In this case, only the single wind turbine 100 is disconnected. In such embodiments, if the subsystem switch 156 (or power converter 122) is unable to clear the fault, the controller 136 is further configured to drop the block signal 162 and optionally communicate same to a separate line.

In another embodiment, as shown in FIG. 8, if the controller 136 detects a fault in the cluster transformer 158 (as indicated by reference character 168), the controller 136 is configured to send, via the cluster switch 160, a trip signal 164 to at least one of the subsystem switches 156 or power converters 122 to disconnect at least one of the electrical power subsystems 102 from the power grid. More specifically, in certain embodiments, if a short-circuit fault or a grid open fault is detected, the controller 136 is configured to send, via the cluster switch 160, the trip signal 164 to each of the subsystem switches 156 or the converter controllers 154 to disconnect each of the electrical power subsystems 102 from the power grid. Further, if the fault current flows in the substation relay 156 near the cluster transformer 158 but not in any of the single wind turbines 100, the fault can be known to be between the cluster transformer 158 and the wind turbines 100 in that cluster 137.

Figure 9:
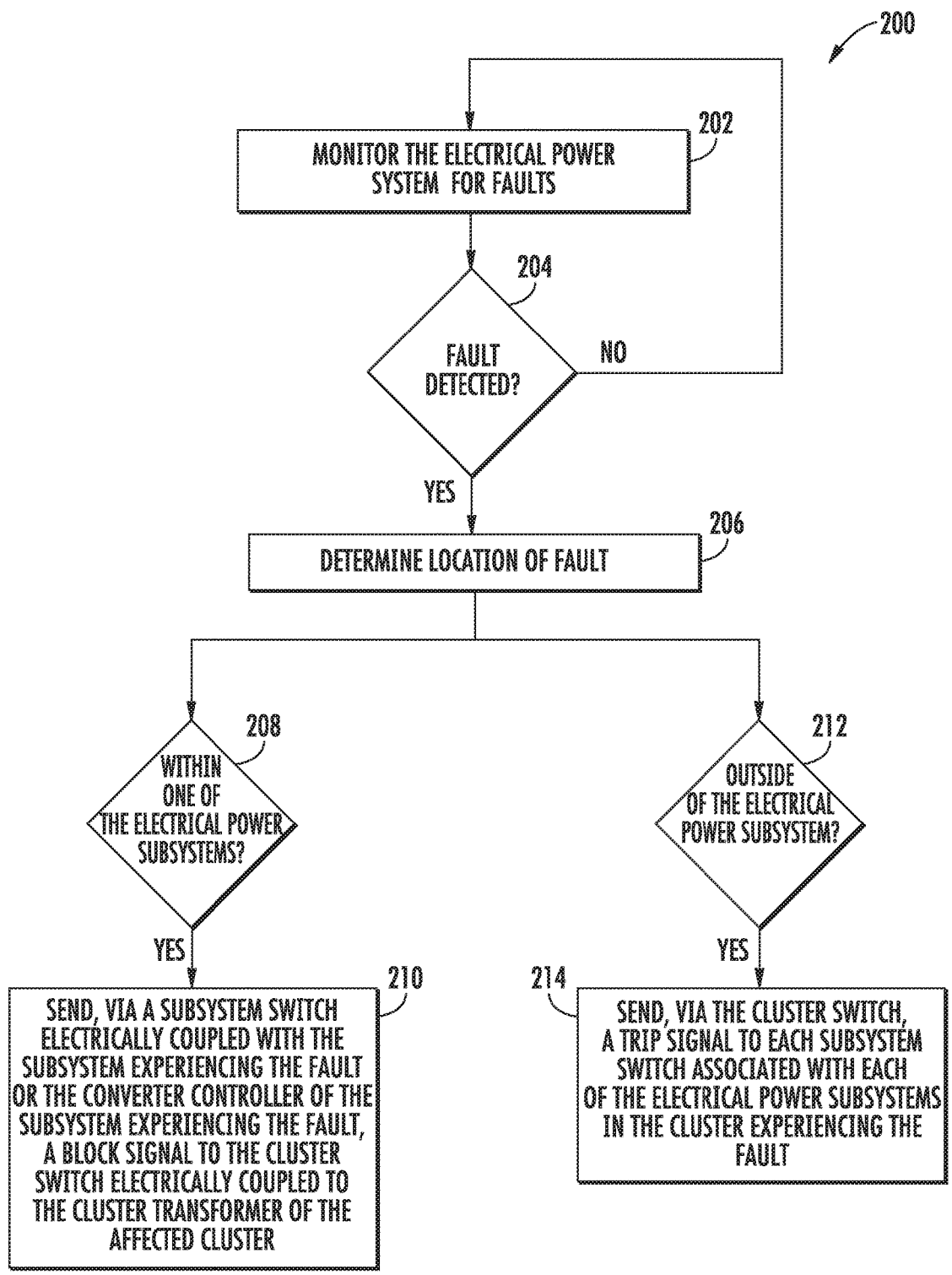
FIG. 9 illustrates a flow diagram of one embodiment of a method for protecting an electrical power system according to the present disclosure.

Referring now to FIG. 9, a flow diagram of one embodiment of a method 200 for protecting an electrical power system according to the present disclosure is illustrated. As shown at 202, the method 200 includes monitoring the electrical power system 105 for faults. As shown at 204, the method 200 determines whether a fault is detected. As shown at 206, upon detection of a fault in one of the clusters 137 of electrical power subsystems 102, the method 200 also includes determining a location of the fault. More specifically, as shown at 208, the method 200 determines if the location of the fault is within one of the electrical power subsystems 102, e.g. in the stator power path 125 of one of the electrical power subsystems 102. As shown at 210, if the fault is located within one of the electrical power subsystems 102, the method 200 includes sending, via a subsystem switch 156 electrically coupled with the subsystem 102 experiencing the fault 166 (FIG. 7) or the converter controller 154 of the subsystem 102 experiencing the fault, a block signal 162 to the cluster switch 160 electrically coupled to the cluster transformer 158 of the affected cluster 137. Alternatively, as shown at 212, the method 200 determines if the fault is located outside of the electrical power subsystems 102, e.g. in the cluster transformer 158. As shown at 214, if the fault is located outside of the electrical power subsystems 102 (FIG. 8), the method 200 includes sending, via the cluster switch 160, a trip signal 164 to each subsystem switch 156 associated with each of the electrical power subsystems 102 in the cluster 137 experiencing the fault 166.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical power system connected to a power grid, comprising:
   at least one cluster of electrical power subsystems, each of the electrical power subsystems comprising a power converter electrically coupled to a generator having a generator rotor and a generator stator, each of the electrical power subsystems defining a stator power path and a converter power path for providing power to the power grid, each of the electrical power subsystems further comprising a partial power transformer within the converter power path;
   a subsystem switch configured with each of the electrical power subsystems;
   a cluster transformer connecting each cluster of electrical power subsystems to the power grid;
   a cluster switch communicatively coupled to the cluster transformer; and,
   a controller communicatively coupled to each of the plurality of electrical power subsystems, the controller configured to perform one or more operations, the operations comprising:
   monitoring the electrical power system for faults; and,
   if a fault is detected in the stator power path of one of the electrical power subsystems, sending, via one of the subsystem switches or the power converters, a block signal to the cluster switch, the block signal comprising a signal that instructs the cluster switch to not trip in response to the fault being detected.

2. The electrical power system of claim 1, wherein the partial power transformer comprises at least one of a two-winding transformer or a three-winding transformer.

3. The electrical power system of claim 1, wherein the subsystem switches and the cluster switch comprise subsystem relays and a cluster relay, respectively.

4. The electrical power system of claim 3, wherein the subsystem relays and the cluster relay comprise differential relays configured to isolate the fault in one of the electrical power subsystems.

5. The electrical power system of claim 1, wherein monitoring the electrical power system for faults further comprises monitoring the stator power path of each of the electrical power systems for faults.

6. The electrical power system of claim 1, wherein if the subsystem switch of the electrical power subsystem experiencing the fault is unable to clear the fault, the controller is further configured to drop the block signal.

7. The electrical power system of claim 1, wherein the generator of each of the electrical power subsystems comprises a doubly-fed induction generator (DFIG).

8. The electrical power system of claim 1, wherein the electrical power system comprises a wind farm, and wherein the electrical power subsystems comprise wind turbine power systems.

9. An electrical power system connected to a power grid, comprising:
   at least one cluster of electrical power subsystems, each of the electrical power subsystems comprising a power converter electrically coupled to a generator having a generator rotor and a generator stator, each of the electrical power subsystems defining a stator power path and a converter power path for providing power to the power grid, each of the electrical power subsystems further comprising a partial power transformer within the converter power path;
   a subsystem switch configured with each of the electrical power subsystems;
   a cluster transformer connecting each cluster of electrical power subsystems to the power grid;
   a cluster switch communicatively coupled to the cluster transformer; and,
   a controller communicatively coupled to each of the plurality of electrical power subsystems, the controller configured to perform one or more operations, the operations comprising:
   monitoring the electrical power system for faults; and,
   if a fault is detected in the cluster transformer, sending, via the cluster switch, a trip signal to at least one of the subsystem switches or one of the power converters of the electrical power subsystems to disconnect at least one of the electrical power subsystems from the power grid, the trip signal comprising a signal that instructs at least one of the subsystem switches or one of the power converters to disconnect at least one of the electrical power subsystems from the power grid.

10. The electrical power system of claim 9, wherein the partial power transformer comprises at least one of a two-winding transformer or a three-winding transformer.

11. The electrical power system of claim 9, wherein the subsystem switches and the cluster switch comprise subsystem relays and a cluster relay, respectively.

12. The electrical power system of claim 9, wherein monitoring the electrical power system for faults further comprises monitoring the cluster transformer for faults.

13. The electrical power system of claim 12, wherein, if the fault is detected in the luster transformer, the operations further comprise sending, via the cluster switch, the trip signal to each of the subsystem switches or each of the power converters to disconnect each of the electrical power subsystems from the power grid.

14. A method for protecting an electrical power system, the electrical power system having a plurality of clusters of electrical power subsystems with a cluster transformer connecting each cluster of electrical power subsystems to a power grid, each of the electrical power subsystems having a power converter electrically coupled to a generator with a generator rotor and a generator stator, each of the electrical power subsystems defining a stator power path and a converter power path for providing power to the power grid, each of the electrical power subsystems further comprising a partial power transformer within the converter power path, the method comprising:
   monitoring the electrical power system for faults;
   wherein monitoring the electrical power system for faults further comprises monitoring the stator power path of each of the electrical power systems for faults and monitoring the cluster transformer for faults;
   upon detection of a fault in one of the clusters of electrical power subsystems, determining a location of the fault;
   if the fault is located within the stator power path of one of the electrical power subsystems of one of the clusters, sending, via a subsystem switch electrically coupled with the electrical power subsystem experiencing the fault or a power converter of the electrical power subsystem experiencing the fault, a block signal to a cluster switch electrically coupled to the cluster transformer associated with the cluster experiencing the fault, the block signal comprising a signal that instructs the cluster switch to not trip in response to the fault being detected; and, if the fault is located outside of the electrical power subsystems but within one of the clusters, in the cluster transformer, sending, via the cluster switch, a trip signal to each subsystem switch or each power converter within the cluster experiencing the fault, the trip signal comprising a signal that instructs each subsystem switch or each power converter within the cluster experiencing the fault to disconnect from the power grid.

15. The method of claim 14, wherein the subsystem switches and the cluster switch comprise subsystem relays and a cluster relay, respectively.

16. The method of claim 15, wherein the subsystem relays and the cluster relay comprise differential relays configured to isolate the fault in one of the electrical power subsystems.

17. The method of claim 14, wherein, if the subsystem switch is unable to clear the fault, the method further comprises dropping the block signal and communicating the dropped signal to a controller.

18. The method of claim 14, wherein the electrical power system comprises a wind farm, and wherein the electrical power subsystems comprise wind turbine power systems.

* * * * *